United States Patent [19]
Nowell

[11] 3,766,433
[45] Oct. 16, 1973

[54] CROWBAR CIRCUIT RESPONSIVE TO DECREASE IN THE POWER SUPPLY
[75] Inventor: John R. Nowell, Phoenix, Ariz.
[73] Assignee: Honeywell Information Systems, Inc., Waltham, Mass.
[22] Filed: May 1, 1972
[21] Appl. No.: 249,285

[52] U.S. Cl. ............... 317/16, 317/31, 317/33 SC, 320/1
[51] Int. Cl. ............................................. H02h 3/24
[58] Field of Search ................... 340/174 C, 174 340/174 TB; 320/1; 317/16, 31, 33 SC, 33 R; 321/47; 307/202

[56] References Cited
UNITED STATES PATENTS
3,538,383  11/1970  Ritter ........................... 317/33 SC OTHER PUBLICATIONS
SCR Manual; 4th Ed., 1967; Gutzwiller (Editor); pp. 158–159

Primary Examiner—J. D. Miller
Assistant Examiner—Harvey Fendelman
Attorney—Lloyd B. Guernsey et al.

[57] ABSTRACT

A unijunction transistor, a capacitor, a transformer, an SCR and resistors provide an inexpensive crowbar circuit for use with a switching regulator. The crowbar circuit causes a voltage from the switching regulator to drop rapidly when the switching regulator is turned off.

6 Claims, 2 Drawing Figures

CROWBAR CIRCUIT RESPONSIVE TO DECREASE IN THE POWER SUPPLY

BACKGROUND OF THE INVENTION

This invention relates to crowbar circuits and more particularly to crowbar circuits which use relatively few inexpensive components.

The switching regulator is a type of power supply which is commonly used to convert from an A.C. voltage to a D.C. voltage and to supply relatively large quantities of current at a low voltage for use in electronic data processing systems. In order to prevent the D.C. output voltage from varying large capacitors are connected across the output terminals of the switching regulator. These large capacitors not only prevent variations in the output voltage when the switching regulator is operating but also prevent the rapid decay of voltage across the output terminals when the switching regulator is turned off. In many of the applications in the data processing systems it is desirable that the output voltage of the switching regulator drop very rapidly when the switching regulator is turned off. If the voltage across the switching regulator output terminals does not decrease rapidly when the regulator is turned off this may cause the development of error signals in the data processing system and may cause a loss of data in a core memory. Since core memories may require relatively small amounts of current the output voltage on the switching regulator which provides current to a core memory may remain relatively high while the voltage to the memory control circuits connected to the core memory may drop rather rapidly. This rapid decrease in voltage to the memory control circuits may develop error signals which cause the loss of data stored in the core memory.

Crowbar circuits are used to cause the voltage at the core memory to drop rapidly when the switching regulator which provides current for the core memory is turned off. Prior art crowbar circuits may use a plurality of transistors and thyristors to cause this core memory voltage to drop. Such prior art crowbar circuits are relatively expensive. What is needed is an inexpensive crowbar circuit which will cause the core memory voltage to drop when the switching regulator is turned off, but will not affect the core memory voltage when voltage on the A.C. lines from the public utility company fluctuates.

It is, therefore, an object of this invention to provide a new and improved crowbar circuit which causes the output of a switching regulator to quickly drop to a low value when the input voltage to the regulator is turned off.

Another object of this invention is to provide a new and improved crowbar circuit which is not activated by normal line voltage fluctuations.

A further object of this invention is to provide an inexpensive crowbar circuit.

SUMMARY OF THE INVENTION

The foregoing objects are achieved in the present invention by providing an inexpensive crowbar circuit which includes a single unijunction transistor, a capacitor, a transformer, an SCR and resistors.

Other objects and advantages of this invention will become apparent from the following description when taken in connection with the accompanying drawings.

Figure 1:
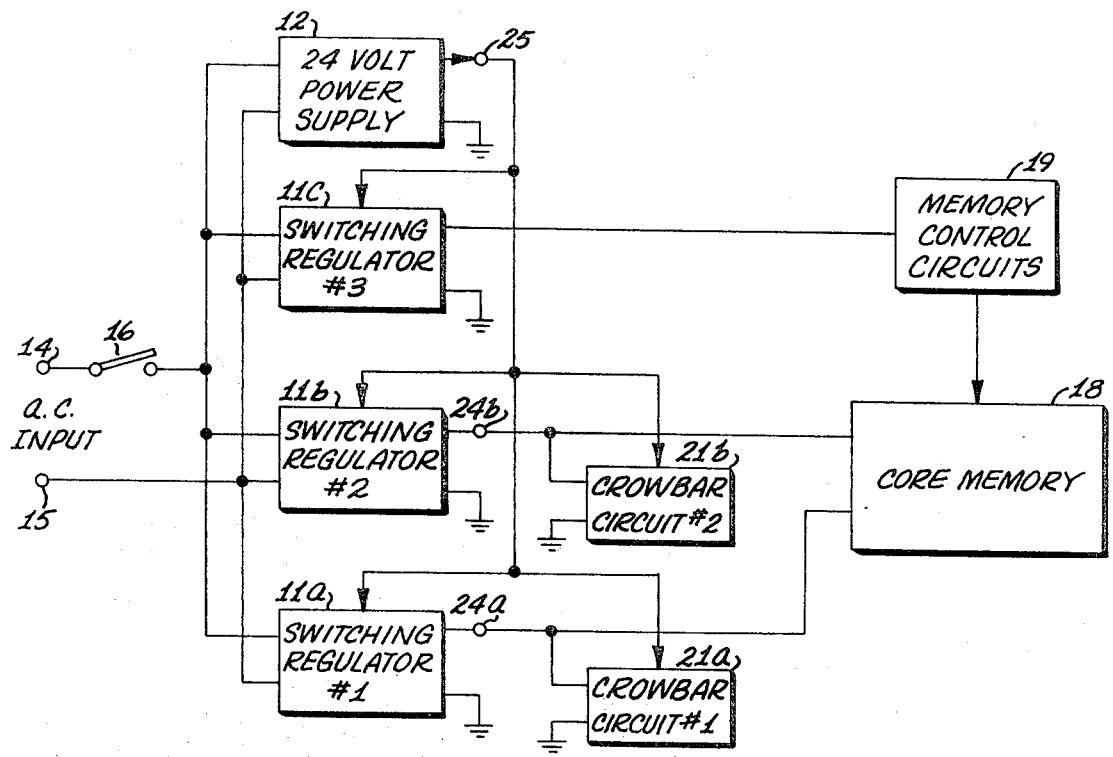
FIG. 1 is a diagram of a portion of a data processing system using the present invention.

A typical data processing system may employ a plurality of switching regulators 11a–c as shown in FIG. 1. The A.C. input for the switching regulators is connected to the input terminals 14 and 15 and is coupled through switch 16 to the switching regulators and to the power supply 12. The power supply 12 provides control voltage for the switching regulators and for other portions of the data processor system. The switching regulators provide D.C. power for the core memory 18 and for the memory control circuits 19. The crowbar circuits 21a and 21b are connected to the output terminals 24a and 24b respectively of the switching regulators which supply power for the core memory 18. It is important that the voltage from the regulators 11a and 11b drop quickly when the switch 16 is opened so that voltage to the core memory decreases rapidly. The crowbar circuits cause the voltage at the output terminals 24a and 24b to decrease rapidly. The voltage from the switching regulator 11c to the memory control circuits should decrease at a slower rate than the voltage from the switching regulators which are used with the core memory, therefore a crowbar circuit is not used on the switching regulator which is connected to the memory control circuits 19.

DESCRIPTION OF THE PREFERRED EMBODIMENT

Figure 2:
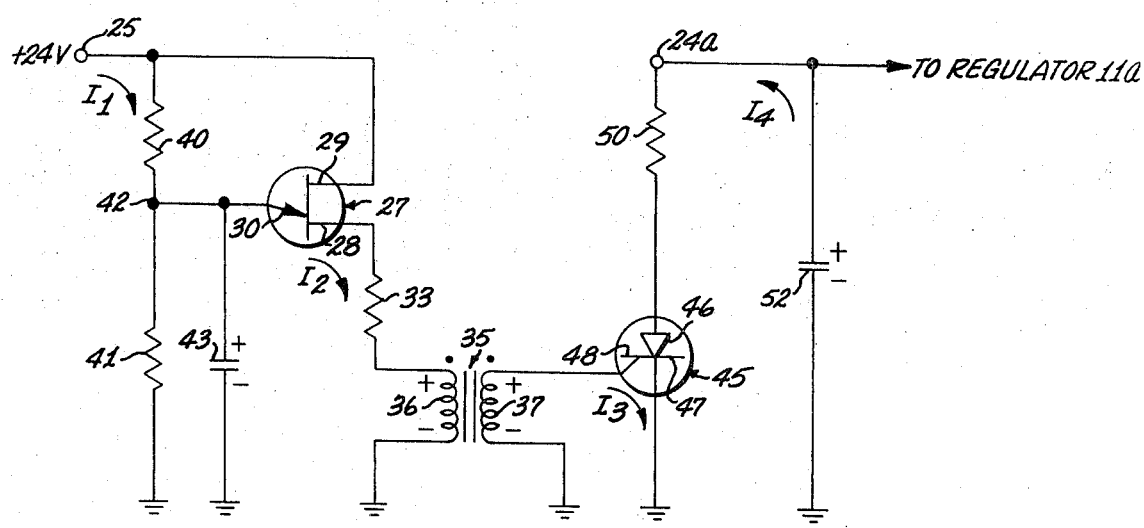
FIG. 2 is a circuit diagram of one embodiment of the present invention.

The crowbar circuit shown in FIG. 2 includes a unijunction transistor 27 having a first base or "base-one" 28, a second base or "base-two" 29 and an emitter 30. Base-two is connected to output terminal 25 of the 24 volt power supply shown in FIG. 1. A resistor 33 and a primary winding 36 of transformer 35 are connected between base-one and a reference potential, such as ground. A voltage divider comprising resistors 40 and 41 is connected between the terminal 25 and ground. Junction point 42 between resistors 40 and 41 is connected to the emitter of the unijunction transistor 27. A capacitor 43 is connected between the emitter of the unijunction transistor and ground. A unijunction transistor is a semiconductor device having a first base or "base-one," a second base or "base-two" and an emitter. If a positive voltage difference exists between base-two and base-one, the unijunction transistor cannot conduct current between the emitter and base-one until a voltage greater than a first predetermined threshold or "peak point voltage" value exists between the emitter and base-one. When the voltage on the emitter is more than the peak point voltage, current flows from emitter to base-one until the emitter voltage decreases below a second predetermined or "valley voltage" value. The peak point voltage is a fixed percent of the voltage between base-one and base-two. A more detailed description of a unijunction transistor can be found in Chapter 13 of The Transistor Manual, Seventh Edition, 1964, published by The General Electric Company, Syracuse, New York.

The secondary winding 37 of transformer 35 is connected between the gate of the silicon controlled rectifier 45 and ground. The silicon controlled rectifier or SCR is a semiconductor device having a first output electrode or anode, a second output electrode or cathode and a gate. The SCR can be used as an ON-OFF switch which can be turned on in a very few microseconds. Normally the SCR cannot conduct current between anode and cathode thereof until a pulse of current larger than a threshold value flows from gate to cathode. If a positive voltage exists between the anode and cathode when the pulse of current flows in the gate, the SCR "fires"; i.e., is rendered conductive and a current will flow from the anode to the cathode. Once anode-cathode current flow commences, the gate has no further control over such current flow. Current flow from the anode to cathode in the rectifier can be terminated only by reducing the anode to cathode current below a "holding" or minimum current value. A more detailed description of a silicon controlled rectifier can be found in The Silicon Controlled Rectifier Manual, Fourth Edition, 1967, published by The General Electric Company, Syracuse, New York.

Terminal 24 is the voltage output terminal of a switching regulator such as regulator 11a or 11b. Capacitor 52 is the output filter capacitor of the switching regulator. A resistor 50 may be used to limit the current through SCR 45 and prevent possible damage to the SCR.

The operation of the crowbar circuit shown in FIG. 2 will now be discussed with reference to the circuits of FIG. 1. When the switch 16 in FIG. 1 is open it is desired that the voltage at output terminals 24a and 24b of the switching regulators 11a and 11b decrease rapidly so that power will not be 11c to the core memory 18. At this same time it is desired that the voltage from the switching regulator 11c decrease at a slower rate than the output voltage from the switching regulators 11a and 11b. When switch 16 is open the voltage from the volt power supply 12 decreases rapidly. This rapid decrease in voltage can be used by the crowbar circuits 21a and 21b to sense that switch 16 has been opened and that the voltage from the output terminals of the switching terminals 11a and 11b should be decreased very rapidly.

During the time that the switching regulators 11a and 11b are delivering the normal value of output voltage the voltage at terminal 25 of FIG. 2 is a +24 volts. This +24 volts causes a current $I_1$ to flow from terminal 25 through resistor 40 to the upper plate of capacitor 43, from the lower plate of capacitor 43 to ground thereby charging capacitor 43 to the polarity shown in FIG. 2. The value of this voltage on capacitor 43 is determined by the values of resistors 40 and 41 in the frequency divider circuit.

The +24 volts at terminal 25 is applied to base-two of the unijunction transistor 27. Since the voltage on base-two is greater than the voltage on the emitter of transistor 30 the unijunction transistor 27 is held in a nonconductive condition so that capacitor 43 will not be discharged.

When the voltage at terminal 25 decreases the voltage on the base-two of the unijunction transistor 27 decreases. However, the charge on capacitor 43 prevents the voltage on the emitter of transistor 27 from dropping. Thus, when the voltage on base-two decreases the voltage at the emitter of the unijunction transistor 27 is greater than the peak point value so that a current $I_2$ flows from the upper plate of capacitor 43 through emitter to base-one of unijunction transistor 27, through resistor 33 and primary winding 36 to ground.

Resistor 33 limits the value of current $I_2$ through emitter to base-one of the unijunction transistor 27. Current $I_2$ through primary winding 36 provides a voltage of the polarity shown across primary winding 36 and a voltage of the polarity shown across secondary winding 37 of the transformer 35. The voltage across the secondary winding 37 causes a current $I_3$ to flow from the upper end of secondary winding 37 through the gate 48 to the cathode 47 of the SCR, thereby rendering SCR 45 conductive. When the SCR is rendered conductive a current $I_4$ flows from the upper plate of capacitor 52 through resistor 50, from the anode 46 to the cathode of SCR, thereby discharging capacitor 52. The resistor 50 has a very small value of resistance so that the capacitor 52 discharges rapidly thereby causing the voltage at the output terminal 24 of the switching regulator to decrease very rapidly.

The present invention provides an inexpensive means of quickly dropping the voltage at the output terminal of a switching regulator when the regulator is turned off. The values of resistors 40 and 41 can be selected so that the voltage across capacitor 43 is slightly less than 50 percent of the normal voltage at terminal 25. The voltage on the base-two 29 can vary several volts without causing the capacitor 43 to discharge. This prevents normal fluctuations of line voltage from causing the capacitor to discharge.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A crowbar circuit for causing the voltage at the output terminal of a power supply to decrease rapidly when power to the input terminals of the supply is turned off, said circuit comprising:

a source of potential, said source providing first and second reference potentials, said source being coupled to said input terminals of said supply;

a unijunction transistor having first and second bases and an emitter, said first potential being connected to said second base of said transistor;

first and second resistors, said first resistor being connected between said first potential and said emitter of said transistor, said second resistor being connected between said second potential and said emitter of said transistor;

a capacitor, said capacitor being connected between said second potential and said emitter of said transistor; and a semiconductor device having first and second output electrodes and a gate electrode, said first output electrode of said device being connected to said output terminal of said supply, said second output electrode of said device being connected to said second potential, said gate electrode of said device being coupled to said first base of said transistor wherein said capacitor holds the voltage supplied to the emitter of said transistor in a steady state for a period of time necessary for said transistor and said device to be rendered conductive upon the decrease in voltage at the input terminals of the power supply.

2. A crowbar circuit as defined in claim 1 including:
a transformer having a primary winding and a secondary winding, said primary winding of said transformer being connected between said second potential and said first base of said transistor, said secondary winding of said transformer being connected between said second potential and said gate electrode of said device.

3. A crowbar circuit as defined in claim 1 including:
a third resistor; and
a transformer having a primary winding and a secondary winding, said primary winding of said transformer being connected between said second potential and a first end of said third resistor, a second end of said third resistor being connected to said first base of said transistor, said secondary winding of said transformer being connected between said second potential and said gate electrode of said device.

4. A crowbar circuit for causing the voltage at the output terminal of a power supply to decrease rapidly when power to the input terminals of the supply is turned off, said circuit comprising:
a source of potential, said source providing first and second reference potentials, said source being coupled to said input terminals of said supply;
a unijunction transistor having first and second bases and an emitter, said first potential being connected to said second base of said transistor;
first and second resistors, said first resistor being connected between said first potential and said emitter of said transistor, said second resistor being connected between said second potential and said emitter of said transistor;
a capacitor, said capacitor being connected between said second potential and said emitter of said transistor; and
a silicon controlled rectifier having an anode, a cathode and a gate, said anode of said rectifier being connected to said output terminal of said supply, said cathode of said rectifier being connected to said second potential, said gate of said rectifier being coupled to said first base of said transistor wherein said capacitor holds the voltage applied to the emitter of said transistor in a steady state for a period of time necessary for said transistor and said rectifier to be rendered onductive upon the decrease in voltage at the input terminals of the power supply.

5. A crowbar circuit as defined in claim 4 including:
a transformer having a primary winding and a secondary winding, said primary winding of said transformer being connected between said second potential and said first base of said transistor, said secondary winding of said transformer being connected between said second potential and said gate of said rectifier.

6. A crowbar circuit as defined in claim 4 including:
a third resistor; and
a transformer having a primary winding and a secondary winding, said primary winding of said transformer being connected between said second potential and a first end of said third resistor, a second end of said third resistor being connected to said first base of said transistor, said secondary winding of said transformer being connected between said second potential and said gate of said rectifier.

* * * * *